May 10, 1966 J. FOSSE 3,250,924
DELAY DEVICE CHARACTERIZED BY AN OSCILLATORY STATE
EXISTING FOR A PREDETERMINED PERIOD
Filed June 26, 1964 2 Sheets-Sheet 1

INVENTOR.
JACQUES FOSSE
BY
Frank R. Trifari
AGENT

INVENTOR.
JACQUES FOSSE
BY
Frank R. Trifari
AGENT 3,250,924

DELAY DEVICE CHARACTERIZED BY AN OSCILLATORY STATE EXISTING FOR A PREDETERMINED PERIOD

Jacques Fosse, Argenteuil, France, assignor to North American Philips Company, Inc., New York, N.Y., a corporation of Delaware Filed June 26, 1964, Ser. No. 378,369
Claims priority, application France, July 2, 1963, 940,109
6 Claims. (Cl. 307—88.5)

The invention relates to a delay device for the production of an output signal at a predetermined time after a control signal has been applied.

For the introduction of a delay into the transmission of information it is known to use a capacitor which is alternately charged and discharged, the discharge time determining the delay time. Since the discharge of the capacitor is fundamentally exponential, the duration of the said delay can be determined with only a slight degree of accuracy. Hence, it is known for the discharge to take place through an amplifying element having a high internal impedance. If the delay time is large, the capacitor voltage varies comparatively slowly per unit of time, an effect particularly noticeable toward the latter segment of an exponential rise time characteristic, unless a high supply voltage is used, so that the instant at which the capacitor voltage reaches a predetermined threshold value is also determined with a comparatively slight degree of accuracy.

It is an object of the invention to provide a delay device which does not require a high supply voltage and permits accurate determination of the delay period.

According to the invention the discharge current of the capacitor acts as the supply current for an amplifying element connected as an oscillator, the time delay being determined by the time difference between the beginning of the discharge period and the collapse of the oscillation.

Figures 1A, 1B:
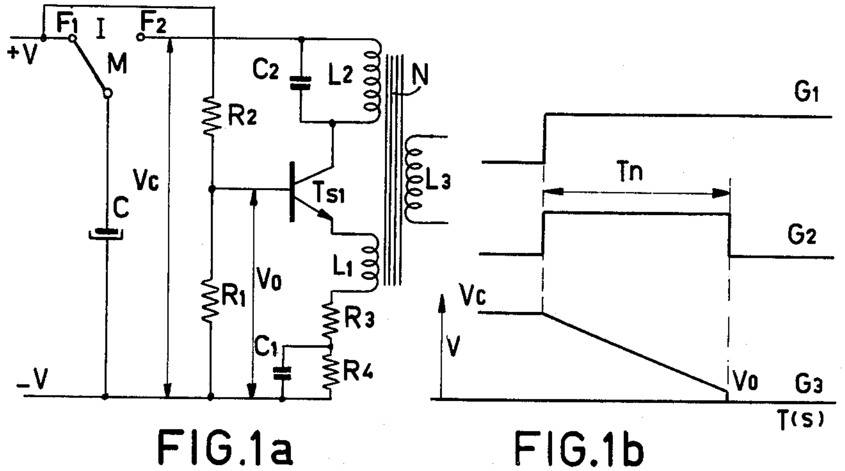
Figures 2A, 2B:
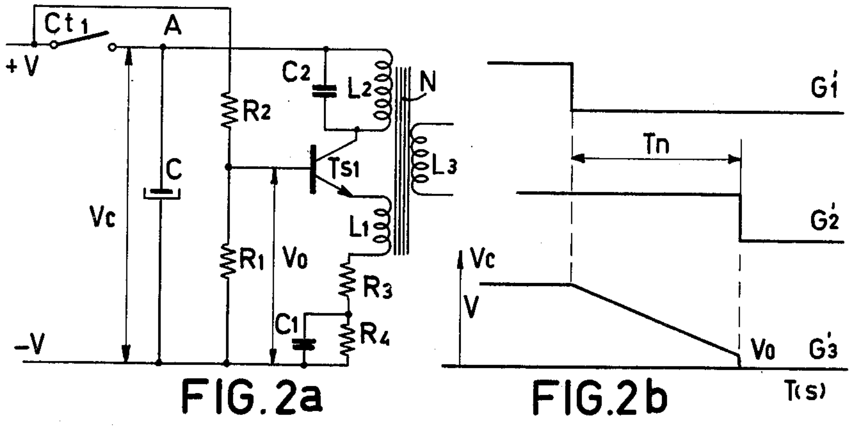
Figures 3A, 3B:
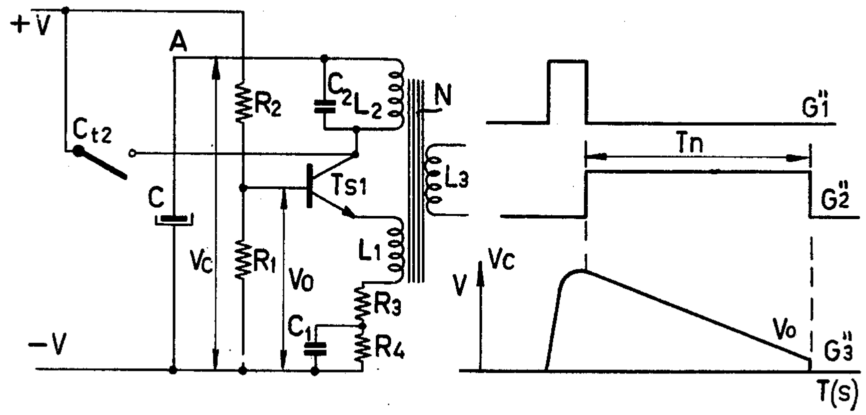

In order that the invention may be readily carried into effect, embodiments thereof will now be described, by way of example, with reference to the accompanying diagrammatic drawings, in which:

FIGURES 1*a*, 2*a*, 3*a* and 4 show various embodiments of devices in accordance with the invention, and FIGURES 1*b*, 2*b* and 3*b* are time diagrams.

In the circuit arrangement shown in FIGURE 1*a* a transistor T*s*1 is included in a generator circuit. The base of the transistor is connected to the tap on a voltage divider R1, R2 connected between the terminals +V and —V of a supply source (not shown) so that a constant bias V*o* is applied to the base.

The emitter circuit includes a winding L1 forming the feedback winding of the generator and connected in series with resistors R3 and R4, the resistor R4 being shunted by a capacitor C1. The transistor T*s*1 may be, for example, of the npn-type, the emitter circuit being connected to the negative voltage supply terminal —V. The collector is connected through a resonant circuit comprising the parallel combination of a winding L2 and a capacitor C2 to the fixed contact F2 of a change-over switch I operated by a control device (not shown). The other fixed contact F1 of the change-over switch I is connected to the positive terminal +V of the supply source.

In the rest condition of the circuit arrangement a capacitor C is connected, at terminal M, through the switch I, between the terminals of the supply source so that the capacitor has assumed a given charge. The oscillator is out of circuit. When the switch I is changed over, the capacitor C is connected to the resonant circuit of the oscillator. By means of a core N of magnetic material the windings L1 and L2 are coupled to one another and to a winding L3 which with the aid of a known auxiliary circuit, for example, an amplifier, a relay or the like, is connected to the circuit to be controlled (not shown).

The switching process is initiated by the switch I being changed over, the capacitor being switched as a supply source for the generator; at the instant of the said changeover the capacitor commences to discharge through the collector emitter circuit of the transistor T*s*1 with the result that the generator starts oscillating.

The discharge takes place with constant current in accordance with the property of junction transistors in which a constant emitter current (fixed base bias) entails a constant collector current. Consequently, the voltage of the capacitor falls off in linear relationship with time and the oscillator oscillates, applying an alternating output voltage to the winding L3 until the capacitor reaches the threshold voltage V*o*, at which instant the oscillator abruptly stops oscillating. Thus the oscillating period T*n* is accurately determined. The collapse of the output voltage at the winding L3 initiates the respective delayed switching operation in a non-specified manner.

FIGURE 1*b* shows the operating diagram of the circuit arrangement, time being plotted as the horizontal axis. A curve G1 indicates the position of the change-over switch I; a curve G2 corresponds to the oscillating condition of the oscillator. A curve G3 indicates the potential variations of the capacitor.

The linear variation of the discharge of the capacitor enables the delay time T*n* to be determined with an accuracy of ±5% greatly exceeding the accuracy obtainable in the case of an exponential discharge. For example, between —20° C. and +70° C. for a tantalum capacitor of 47 μf. which discharges with a constant current of 250 μa. the time Tn is 5 seconds ±0.3 second. The delay time may be set to the desired value by varying a resistor R3.

In the circuit arrangement shown in FIGURE 2*a* the capacitor C is permanently connected to the oscillator at a point A while in the rest condition. The oscillator is connected through a switch contact C*t*1 to the positive terminal +V of the supply source. The oscillator, which otherwise is similar to that shown in FIGURE 1*a*, consequently oscillates continuously in the rest condition of the circuit arrangement, while at the same time the capacitor C assumes a given charge.

At the instant at which the contact C*t*1 is opened in order to initiate the delayed switching operations, similarly to the circuit arrangement of FIGURE 1*a* the capacitor C commences to discharge through the oscillator with a constant current (FIGURE 2*b*, curve G'3) and hence maintains it in operation during the indicated time T*n* (FIGURE 2*b*, curve G'2).

In the embodiment shown in FIGURE 3*a* the capacitor C is also permanently connected to the oscillator. A contact C*t*2 is connected to the positive terminal +V of the supply source and also to the lower end of the resonant circuit L2, C2 instead of to its upper end, as is the case in FIGURE 2*a*. Normally the contact C*t*2 is closed so that the capacitor C has a given charge. However, in this circuit arrangement a constant voltage is applied to the collector of the transistor T*s*1, thereby preventing oscillation in a well known manner by clamping the collector voltage at a constant potential to prevent any variation in the output circuit. When the contact C*t*2 is opened, the oscillator starts and the capacitor discharge (FIGURE 3*b*, curve G"3) until such a voltage is reached that the oscillator stops oscillating (FIGURE 3*b*, curve G"2).

Figure 4:
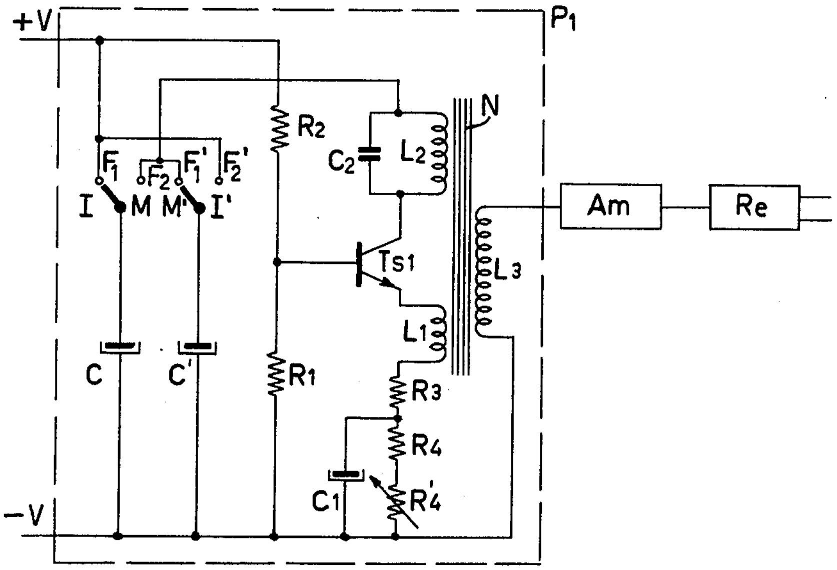

FIGURE 4 shows a delay circuit which may be used, for example, for controlling the circuit breakers of motors for setting railway points, the said motors having to be controlled for an accurately determined period of time to prevent the control motor from becoming heated.

The part of FIGURE 4 indicated within a frame of broken lines P1 shows a circuit arrangement similar to that shown in FIGURE 1 with the difference that it includes two supply capacitors C and C′ which correspond to two change-over switches I and I′ having common contact terminals M and M′ and switched terminals $F_1$, $F_2$ and $F_1'$, $F_2'$, respectively, operated by the same control device.

Each time the circuit breaker is changed over a charged capacitor feeds the oscillator so that it oscillates until the capacitor voltage has fallen to a value such that the oscillator stops oscillating while the other capacitor is being charged for the next control operation.

If, for example, the control device is in the rest condition (contacts F1 and F′1 closed), the capacitor C is charged and the capacitor C′ discharges through the oscillator, while in the operating condition of the control device the procedure is reversed.

In the case of the circuit breaker of a motor for setting railway points the capacitance values of the capacitors C and C′ are equal to provide the same delay times for the same operating conditions. A variable resistor R′4 connected in series with the resistor R4 in the emitter circuit may be so adjusted as to provide the desired delay.

At the output of the circuit arrangement the signal is applied to the circuit to be controlled through an amplifier A*m* and a rectifier R*e*.

What is claimed is:

1. A time delay circuit comprising an amplifying device having feedback means for providing a sustained oscillation when said amplifying device is energized above a minimum potential level, a source of energy having a relatively constant potential level, an energy storage device having a relatively limited potential storage capacity, means connecting said energy storage device to said amplifying device whereby said amplifying device is energized for a time interval determined by the relatively limited potential storage capacity of said energy storage device, means connected to said amplifying device for causing said energy storage device to discharge linearly through said amplifying device, means connected to said amplifying device for detecting a cessation of said oscillation, and switching means connecting said source to said energy storage device to replenish the stored energy thereof.

2. In a time delay circuit an oscillator comprising a transistor having emitter, base and collector electrodes, and feedback coupling said collector and emitter electrodes so as to provide a sustained oscillation when said oscillator is energized above a minimum potential level, a source of energy having a relatively constant potential level, means connecting said source to the base electrode of said transistor so as to provide a fixed bias thereon and a constant current therethrough, an energy storage device having a relatively limited potential storage capacity, means connecting said energy storage device to said oscillator thereby to energize said oscillator for a time interval determined by the relatively limited potential storage of said energy storage device, said last named connection further providing said energy storage device with a linear potential energy decay rate through said oscillator, means connected to said oscillator for detecting a cessation of said oscillation, and switching means connecting said source to said energy storage device to replenish the relatively limited stored potential level thereof.

3. The combination of claim 2 wherein said energy storage device is a capacitor.

4. A time delay circuit comprising a constant current amplifying device having feedback means for providing a sustained oscillation when said amplifying device is energized above a minimum potential level, a source of energy having a relatively constant potential level, an energy storage device having a limited storage capacity, switching means alternatively connecting said source to said energy storage device for charging said energy storage device and said energy storage device to said amplifying device for discharging said energy storage device, means connecting said source to said amplifying device for causing said energy storage device to have a linear potential decay rate through said amplifying device and means connected to said amplifying device for detecting a cessation of said oscillation.

5. A time delay circuit comprising a constant current amplifying device having resonant feedback means for providing a sustained oscillation when said amplifying device is energized above a minimum potential level, a source of energy having a relatively constant potential level, an energy storage device having a limited storage capacity, two position switching means having a first position connecting said source to said energy storage device for charging said energy storage device and to said amplifying device for energizing said amplifying device above said minimum potential level, and a second position disconnecting said source from said energy storage device and said amplifying device whereby said energy storage device maintains oscillation in said amplifying device for a time duration determined by the storage capacity of said energy storage device, means connected to said amplifying device for causing said energy storage device to have a linear potential decay rate through said amplifying device, and means connected to said amplifying device for detecting a cessation of said oscillation.

6. A time delay circuit comprising a constant current amplifying device having a resonant feedback means for providing a sustained oscillation when said amplifying device is energized above a minimum potential level, a source of energy having a relatively constant potential level, an energy storage device comprising a first capacitance and a second capacitance, switching means connecting said source to said first capacitance and said second capacitance to said amplifying device, each of said capacitors being in corresponding alternating states of charges, said switching means alternatively connecting said second capacitance to said source and said first capacitance to said amplifying device, means connecting said source to said amplifying device to cause each of said capacitances, when connected to said amplifying device in a charged state, to exhibit a linear stored potential decay rate, and means connected to said amplifying device for detecting a cessation of said oscillation.

References Cited by the Examiner

UNITED STATES PATENTS

| | | | |
|---|---|---|---|
| 2,721,265 | 10/1955 | Rothman et al. | 328—27 |
| 2,928,052 | 3/1960 | Wood | 331—185 |
| 2,947,881 | 8/1960 | Elliot | 307—88.5 |
| 2,954,527 | 9/1960 | Bradmiller | 328—223 X |
| 2,976,487 | 3/1961 | Cohen. | |
| 3,038,365 | 6/1962 | Peterson | 84—1.26 |
| 3,076,103 | 1/1963 | Bianchi | 328—223 X |
| 3,109,107 | 10/1963 | Lee | 307—88.5 |
| 3,192,507 | 6/1965 | Sudges | 328—170 X |

ARTHUR GAUSS, *Primary Examiner.*

JOHN W. HUCKERT, *Examiner.*

I. C. EDELL, *Assistant Examiner.*